United States Patent
Yonekubo

(10) Patent No.: US 9,618,744 B2
(45) Date of Patent: Apr. 11, 2017

(54) OPTICAL DEVICE AND VIRTUAL IMAGE DISPLAY APPARATUS

(71) Applicant: Seiko Epson Corporation, Tokyo (JP)

(72) Inventor: Masatoshi Yonekubo, Hara-mura (JP)

(73) Assignee: Seiko Epson Corporation, Tokyo (JP)

(*) Notice: Subject to any disclaimer, the term of this patent is extended or adjusted under 35 U.S.C. 154(b) by 207 days.

(21) Appl. No.: 14/556,282

(22) Filed: Dec. 1, 2014

(65) Prior Publication Data

US 2015/0153569 A1 Jun. 4, 2015

(30) Foreign Application Priority Data

Dec. 2, 2013 (JP) ................................. 2013-248928

(51) Int. Cl.
*G02B 27/14* (2006.01)
*G02B 27/01* (2006.01)
(Continued)

(52) U.S. Cl.
CPC .......... *G02B 27/0101* (2013.01); *G02B 5/30* (2013.01); *G02B 6/00* (2013.01); *G02B 27/0081* (2013.01);
(Continued)

(58) Field of Classification Search
CPC ............ G02F 1/133555; G02B 5/3083; G02B 2027/0118; G02B 27/017; G02B 6/0053; G02B 6/4206; G02B 2027/0123; G02B 2027/0125; G02B 2027/0174; G02B 2027/0178; G02B 27/0081; G02B 27/0101; G02B 27/106; G02B 27/141; G02B 27/144; G02B 27/145; G02B 5/30; G02B 6/00
(Continued)

(56) References Cited

U.S. PATENT DOCUMENTS 4,711,512 A 12/1987 Upatnieks
6,847,488 B2 1/2005 Travis
(Continued)

FOREIGN PATENT DOCUMENTS

JP 04-353032 A 12/1992
JP 2007-011057 A 1/2007
JP 2008-041513 A 2/2008

*Primary Examiner* — Scott J Sugarman
*Assistant Examiner* — Daniele Manikeu
(74) *Attorney, Agent, or Firm* — ALG Intellectual Property, LLC

(57) ABSTRACT

A partially transmissive reflective film is provided on a second transparent substrate, and a reflector is provided on a first transparent substrate. The partially transmissive reflective film and the reflector are held parallel to each other with a predetermined spacing therebetween. Thereby, light is incident from a protrusion portion on which the reflector of the first transparent substrate is formed, the light is reflected by the partially transmissive reflective film and the reflector, and the incident light is guided by an air layer between the partially transmissive reflective film and the reflector. A refractive index of the air layer is lower than that of the second transparent substrate. A part of the guided light is extracted from the partially transmissive reflective film, and is emitted from the second transparent substrate on a side opposite to a surface on which the partially transmissive reflective film is provided.

20 Claims, 17 Drawing Sheets

(51) Int. Cl.
*G02B 27/00* (2006.01)
*G02B 5/30* (2006.01)
*G02B 6/00* (2006.01)
*G02B 27/10* (2006.01)

(52) U.S. Cl.
CPC ......... *G02B 27/017* (2013.01); *G02B 27/106* (2013.01); *G02B 27/144* (2013.01); *G02B 27/145* (2013.01); *G02B 2027/0118* (2013.01); *G02B 2027/0123* (2013.01); *G02B 2027/0125* (2013.01); *G02B 2027/0174* (2013.01); *G02B 2027/0178* (2013.01)

(58) Field of Classification Search
USPC .............................. 359/629, 633, 630, 631
See application file for complete search history.

(56) References Cited

U.S. PATENT DOCUMENTS

| | | | | |
|---|---|---|---|---|
| 2011/0273906 A1* | 11/2011 | Nichol | ................. | G02B 6/0076 362/607 |
| 2012/0212824 A1* | 8/2012 | Sakurai | ................... | G02B 5/28 359/579 |
| 2012/0306940 A1* | 12/2012 | Machida | ............... | G02B 6/005 345/690 |
| 2013/0083404 A1* | 4/2013 | Takagi | ............... | G02B 27/0101 359/633 |
| 2014/0022499 A1* | 1/2014 | Tamaki | ............... | G02F 1/13439 349/106 |
| 2014/0319377 A1* | 10/2014 | Morgan | ............. | H01L 31/0547 250/459.1 |

* cited by examiner

FIG. 7A
FIG. 7B
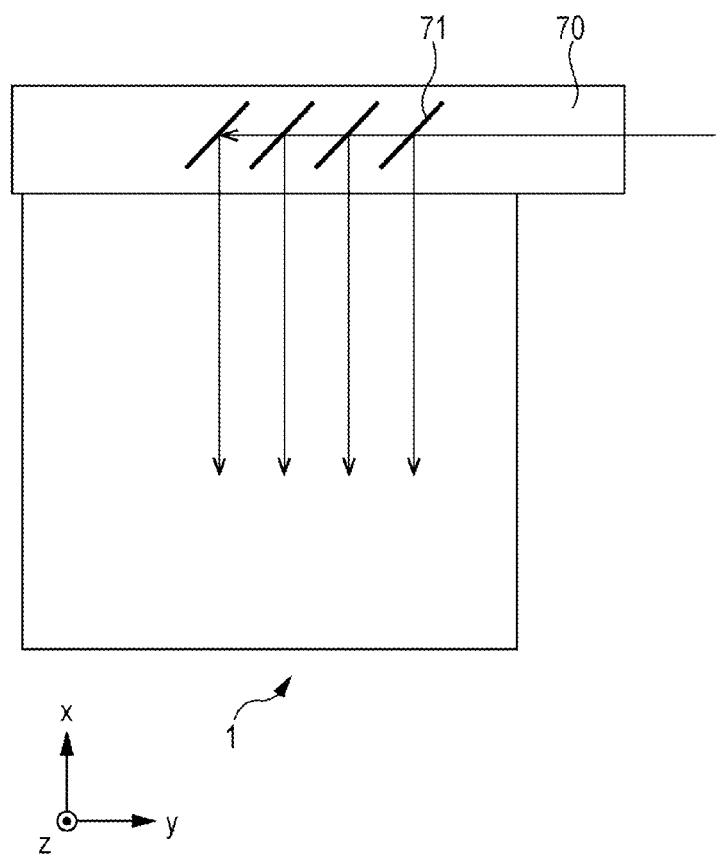
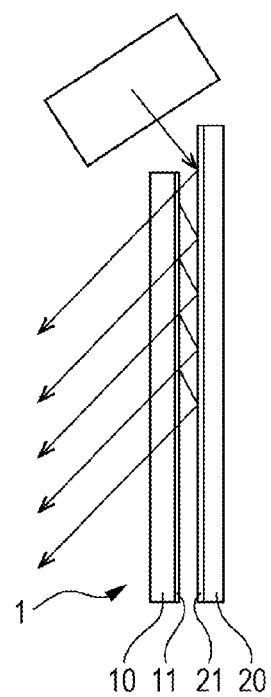

OPTICAL DEVICE AND VIRTUAL IMAGE DISPLAY APPARATUS

BACKGROUND

1. Technical Field

The present invention relates to an optical device, which enlarges an exit pupil of a viewer system, and a virtual image display apparatus including the corresponding optical device.

2. Related Art

In the related art, virtual image displays for displaying a virtual image in an enlarged manner have been studied. However, since the exit pupil diameter of a single image device such as a liquid crystal panel is small, there has been a demand for a pupil enlargement technique having an excellent efficiency with a simple configuration. Further, there has also been a demand for an increase in the angle of view displayed.

For example, in order to extract light from an optical device called a combiner, there has been proposed an apparatus using a diffraction grating (for example, U.S. Pat. No. 4,711,512). In U.S. Pat. No. 4,711,512, a diffraction grating, in which multiple inclined reflective faces are arranged, is used.

However, a structure of U.S. Pat. No. 4,711,512 is complex, and particularly it is difficult to manufacture a large-size virtual image display apparatus with a configuration of U.S. Pat. No. 4,711,512. Further, in the configuration of U.S. Pat. No. 4,711,512, a stripe caused by the diffraction grating may be seen, and thus image quality of a virtual image is lowered.

SUMMARY

Therefore, an advantage of some aspects of the invention is to provide an optical device and a virtual image display apparatus capable of enlarging an exit pupil of a viewer system without causing an undesirable stripe with a simple structure.

According to an aspect of the invention, there is provided an optical device including: a first substrate; a first reflective face that is disposed on one surface of the first substrate; a second substrate that is made of a transmissive material; and a partially transmissive reflective face that is disposed on one surface of the second substrate, in which the first reflective face is disposed to be spaced apart from the partially transmissive reflective face, in parallel with the partially transmissive reflective face, in which a refractive index of the second substrate is higher than a refractive index of a section between the first reflective face and the partially transmissive reflective face which are spaced apart, and in which light incident into the section between the first reflective face and the partially transmissive reflective face which are spaced apart is repeatedly reflected between the first reflective face and the partially transmissive reflective face, and at least a part of the light is transmitted through the partially transmissive reflective face and incident onto the second substrate, and is emitted as outgoing light from a surface different from a surface on which the partially transmissive reflective face of the second substrate is provided.

In the above-mentioned optical device according to the aspect of the invention, the light incident into the section between the first reflective face and the partially transmissive reflective face which are spaced apart is guided while being reflected by the first reflective face and the partially transmissive reflective face. A part of the guided light is transmitted through the partially transmissive reflective face, or is transmitted through the partially transmissive reflective face and thereafter extracted from the second substrate. A refractive index of the section between the first reflective face and the partially transmissive reflective face which are spaced apart is lower than a refractive index of the second substrate. Hence, a part of the light, which is incident onto the partially transmissive reflective film, is transmitted through the second substrate without total reflection. Alternatively, the light, which is incident onto the second substrate, is incident onto the partially transmissive reflective film without total reflection, and a part of the light is extracted by the partially transmissive reflective film. Consequently, the incident light can be extracted while being guided without using a diffraction grating, and thus it is possible to enlarge an exit pupil of a viewer system without causing an undesirable stripe.

In the above-mentioned optical device according to the aspect of the invention, it is preferable that a gas, which has a refractive index lower than a refractive index of the second substrate, be enclosed between the first reflective face and the partially transmissive reflective face. In this case, it is possible to embody the above-mentioned section between the reflective film first reflective face and the partially transmissive reflective face which are spaced apart with a simple configuration. It should be noted that the gas includes air or nitrogen gas.

In the above-mentioned optical device according to the aspect of the invention, it is preferable that a spacer, which holds a spacing between the first reflective face and the partially transmissive reflective face, be provided between the first reflective face and the partially transmissive reflective face. In this case, the spacer holds the parallel state and the spacing of the reflective face and the partially transmissive reflective face, and thus it is possible to satisfactorily guide the incident light.

It is preferable that the above-mentioned optical device according to the aspect of the invention further include an incidence section that causes light to be incident into a gap between the first reflective face and the partially transmissive reflective face, in which the incidence section is a section in which the second reflective face, which reflects the incident light toward the gap between the first reflective face and the partially transmissive reflective face, is provided on an extending portion which extends from an end portion of the first substrate or the second substrate. In this case, the light, which is incident onto the extending portion, is reliably reflected by the high reflectance reflector. Thereby, the light can be incident into the section between the first reflective face and the partially transmissive reflective face which are spaced apart.

In the above-mentioned optical device according to the aspect of the invention, it is preferable that a transmittance of a portion of the partially transmissive reflective face, which is located on a side opposite to the incidence section, be higher than a transmittance of a portion of the partially transmissive reflective face which is located on a side of the incidence section. In this case, it is possible to suppress attenuation of the light, and thus it is possible to prevent brightness from being changed depending on a position of the eyes.

It is preferable that the above-mentioned optical device according to the aspect of the invention further include a light blocking section that prevents outside light from being superimposed upon the outgoing light which is emitted from the second substrate. In this case, even when the optical device is used in a place where the outside light is strong, it is possible to prevent the outside light from being reflected inward by the reflective face of the optical device.

In the above-mentioned optical device according to the aspect of the invention, it is preferable that a polarization plate and a ¼ wavelength plate be provided at a position on a side of the partially transmissive reflective face opposite to the first reflective face. In this case, the outside light is linearly polarized by the polarization plate, and becomes circularly polarized by the ¼ wavelength plate. The outside light, which is reflected by the reflective face, is circularly polarized in a rotation direction which is opposite to a rotation direction at the time of incidence, and is linearly polarized in a polarization direction different from a polarization direction at the time of incidence through the ¼ wavelength plate. Accordingly, the light is absorbed by the polarization plate. As described above, even when the optical device is used in a place where the outside light is strong, it is possible to prevent the outside light from being reflected inward by the reflective face of the optical device.

According to another aspect of the invention, there is provided a virtual image display apparatus including: the above-mentioned optical device; and an image forming section that generates image light, in which the image forming section is disposed such that light, which is emitted from the image forming section, is incident into the section between the first reflective face and the partially transmissive reflective face which are spaced apart.

In the above-mentioned virtual image display apparatus according to the aspect, the light, which is emitted from the image forming section, is incident into the section between the first reflective face and the partially transmissive reflective face which are spaced apart. Therefore, the light with a sufficient width can be incident.

It is preferable that the above-mentioned virtual image display apparatus according to the aspect of the invention further include a first optical device and a second optical device as the above-mentioned optical devices, in which the first optical device emits light, which is emitted from the image forming section, in an enlarged manner, along a first direction, and in which the second optical device emits light, which is emitted from the first optical device, in an enlarged manner, along a second direction intersecting with the first direction. In this case, with a simple configuration, it is possible to enlarge the exit pupil of the viewer system. Further, it is possible to reduce the size of the virtual image display apparatus.

It is preferable that the above-mentioned virtual image display apparatus according to the aspect of the invention further include: a first optical device that is the above-mentioned optical device; and a second optical device that is an optical device having a diffraction grating, in which the first optical device emits light, which is emitted from the image forming section, in an enlarged manner, along a first direction, and in which the second optical device emits light, which is emitted from the first optical device, in an enlarged manner, along a second direction intersecting with the first direction. In this case, in accordance with combination of the second optical device which is an optical device of related art and the first optical device which is the optical device according to the aspect of the invention, with a simple configuration, it is possible to enlarge the exit pupil of the viewer system.

It is preferable that the above-mentioned virtual image display apparatus according to the aspect of the invention further include: a first optical device that is an optical device having a diffraction grating; and a second optical device that is the above-mentioned optical device, in which the first optical device emits light, which is emitted from the image forming section, in an enlarged manner, along a first direction, and in which the second optical device emits light, which is emitted from the first optical device, in an enlarged manner, along a second direction intersecting with the first direction. In this case, with a simple configuration, it is possible to enlarge the exit pupil of the viewer system.

In the above-mentioned virtual image display apparatus according to the aspect of the invention, it is preferable that at least a first incidence section and a second incidence section be provided as the incidence sections, and it is preferable that the image forming section cause light, which is modulated by different image signals, to be respectively incident onto the first incidence section and the second incidence section. In this case, it is possible to display a virtual image having a wide angle of view.

It should be noted that the virtual image display apparatus according to the aspect of the invention may include an image forming section such as a liquid crystal display or an optical collimator system and may be applied to a form in which the apparatus is mounted on a head part of a viewer like a head mounted display and the like. Further, the invention may be applied to not only the head mounted display but also various virtual image display apparatuses such as a pseudo window, a virtual image display, and a head-up display.

Further, in the virtual image display apparatus according to the aspect of the invention, the "image forming section" is defined to include: an apparatus such as a liquid crystal display, which displays an image, and a laser-scanning-type display which shows an image to a viewer by scanning laser light; and an optical system which concentrates and converts the image light which is emitted from an image display.

BRIEF DESCRIPTION OF THE DRAWINGS

The invention will be described with reference to the accompanying drawings, wherein like numbers reference like elements.

FIG. 7A is a plan view illustrating a virtual image display apparatus according to a third embodiment, and FIG. 7B is a cross-sectional view of the virtual image display apparatus of FIG. 7A.

DESCRIPTION OF EXEMPLARY EMBODIMENTS

Figure 1:
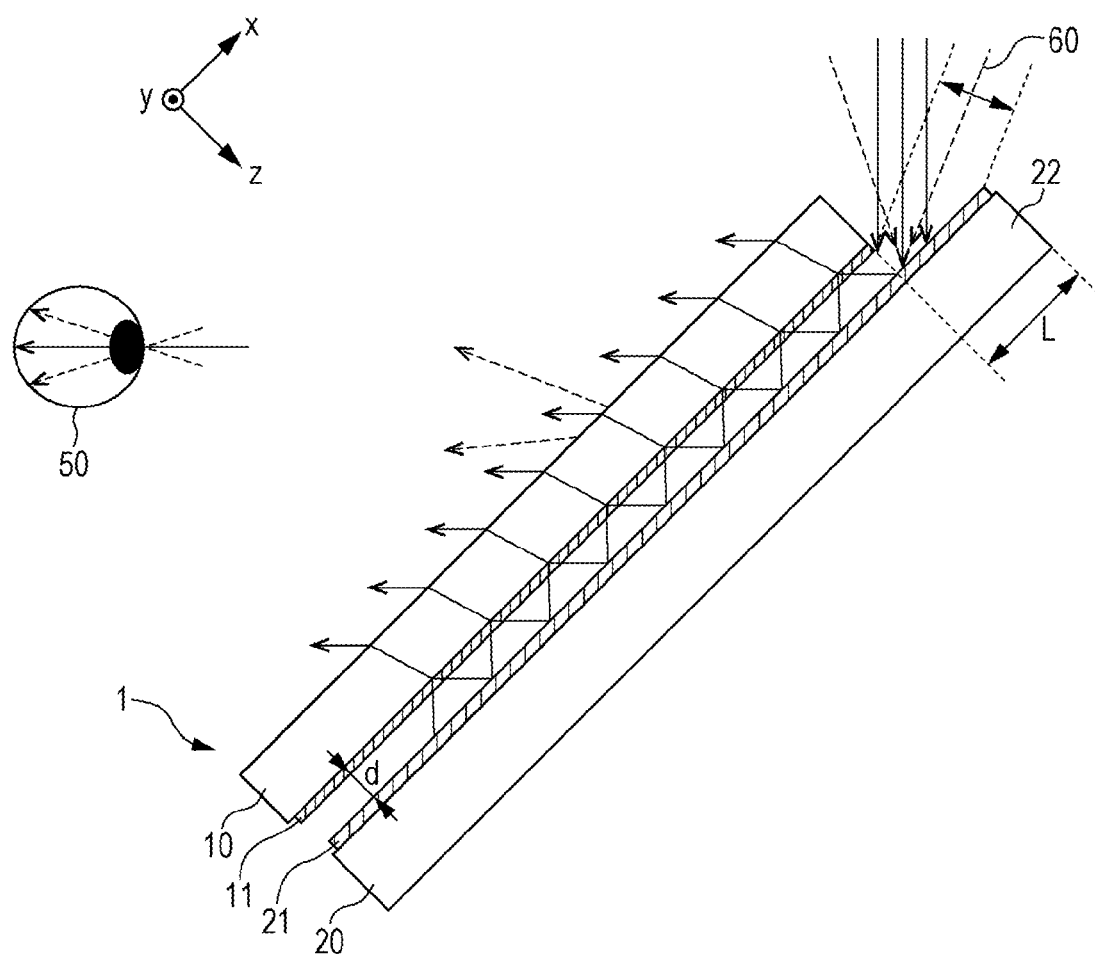
FIG. 1 is a cross-sectional view illustrating an optical device according to a first embodiment.

Hereinafter, various embodiments of the invention will be described with reference to the accompanying drawings. It should be noted that, in the drawings, the ratios between dimensions of the respective sections are appropriately set to be different from those of actual dimensions. Further, in the embodiments to be described later, exemplary cases of applying optical devices according to the embodiments of the invention to a head-up display and the like will be described. However, each embodiment is an aspect of the invention, does not limit the invention thereto, and can be arbitrarily modified within the technical scope of the invention.

First Embodiment

A first embodiment of the invention will be described with reference to FIGS. 1 to 5. As shown in FIG. 1, an optical device 1 of the embodiment includes: a first transparent substrate 20 that is made of glass or transparent resin; and a second transparent substrate 10 that is disposed in parallel with the first transparent substrate 20 and is made of glass or transparent resin. A partially transmissive reflective film 11 is formed on a surface of the second transparent substrate 10 facing the first transparent substrate 20. The partially transmissive reflective film 11 can be formed of a thin metallic film, a dielectric multilayer film, or the like. A high reflectance reflector 21, which is made of aluminum, silver, a dielectric multilayer film, or the like, is provided on a surface of the first transparent substrate 20 facing the second transparent substrate 10.

In the embodiment, the first transparent substrate 20 has a thickness of, for example, 1 to 10 mm, and has a strength that ensures flatness. In the embodiment, the high reflectance reflector 21 has a thickness of, for example, several hundred angstroms to several tens of microns, and is formed as a thin film that ensures reflectance. In the embodiment, the second transparent substrate 10 has a thickness of, for example, 1 to 10 mm, and has strength capable of ensuring flatness. In the embodiment, the partially transmissive reflective film 11 has a thickness of, for example, several hundred angstroms to several tens of microns, and is formed as a thin film that ensures reflection transmission characteristics.

The second transparent substrate 10 and the first transparent substrate 20 are formed to have the same width in a y direction shown in FIG. 1. However, the length of the first transparent substrate 20 in the x direction is longer by a length L than that of the second transparent substrate 10. The second transparent substrate 10 and the first transparent substrate 20 are positioned such that a protrusion portion 22 of the first transparent substrate 20 having the length L is formed on a light incidence side.

Figure 2A:
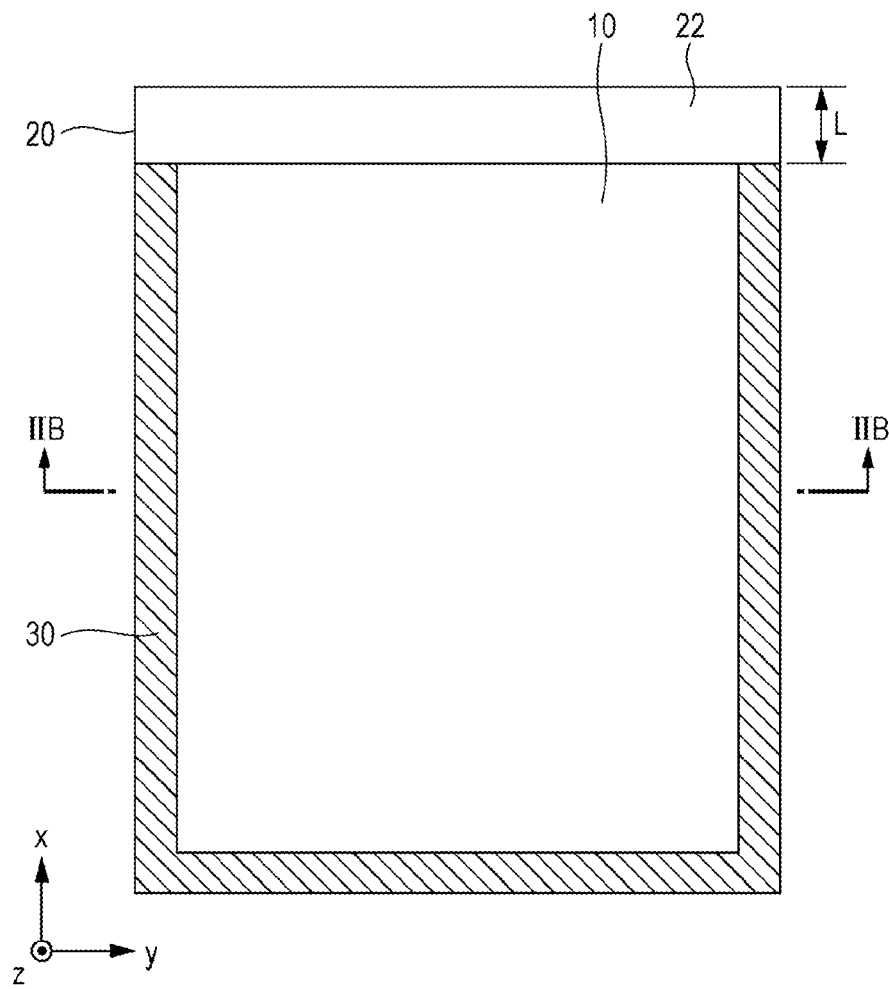
FIG. 2A is a plan view of the optical device.
Figure 2B:
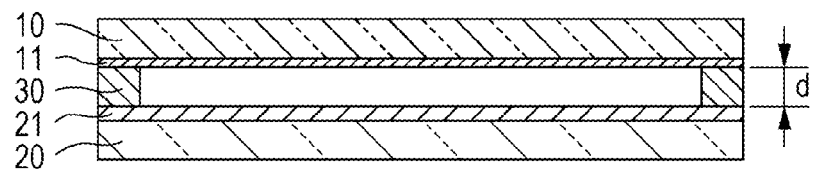
FIG. 2B is a cross-sectional view taken along the line IIB-IIB of FIG. 2A.

As shown in FIGS. 2A and 2B, a U-shaped spacer 30 having three sides other than at the incidence side, on which the protrusion portion 22 is formed, is provided between the second transparent substrate 10 and the first transparent substrate 20, and the second transparent substrate 10 and the first transparent substrate 20, that is, the partially transmissive reflective film 11 and the high reflectance reflector 21 are held parallel to each other. In addition, FIG. 2A is a plan view of the optical device, and FIG. 2B is a cross-sectional view taken along the line IIB-IIB of FIG. 2A.

Figure 3A:
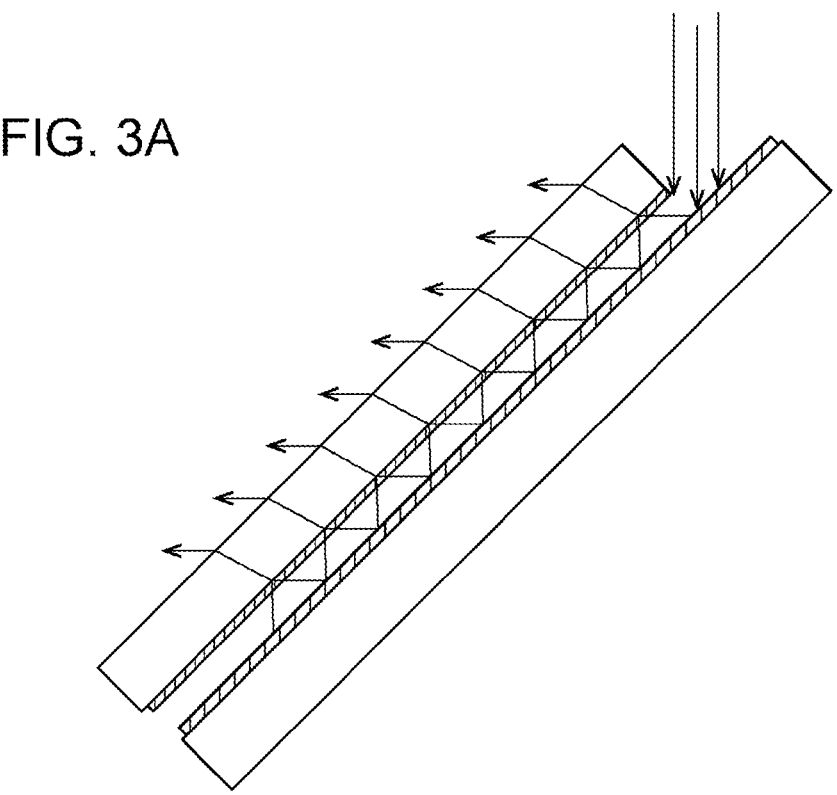
FIG. 3A is a cross-sectional view illustrating a state of light emission in a case where a spacing between a partially transmissive reflective film and a high reflectance reflector is appropriate.
Figure 3B:
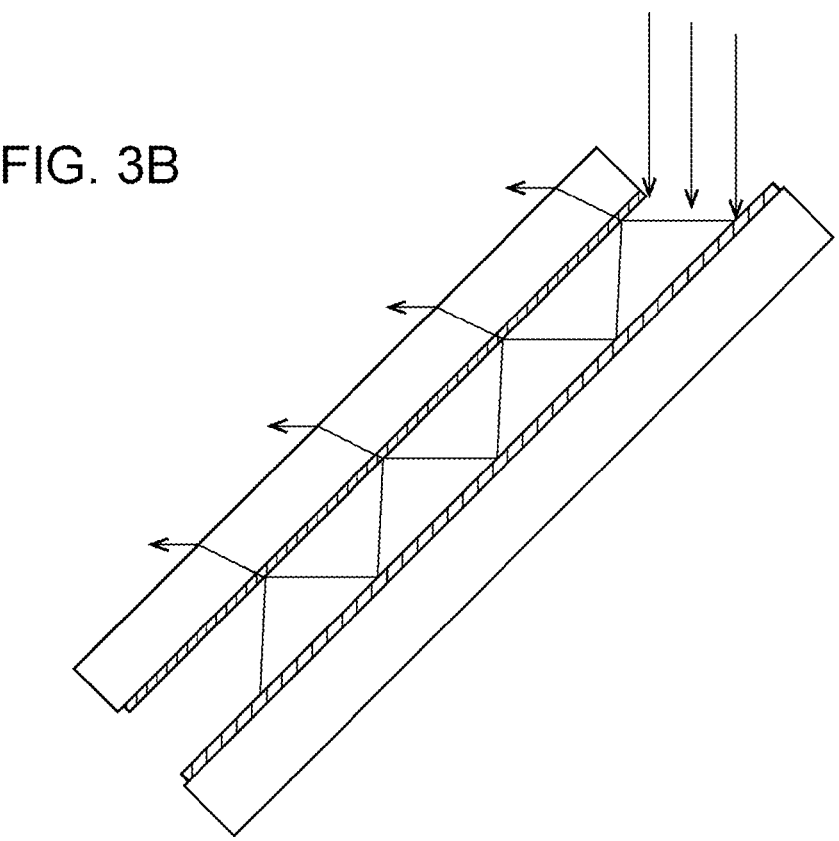
FIG. 3B is a cross-sectional view illustrating a state of light emission in a case where the spacing between the partially transmissive reflective film and the high reflectance reflector is wide.

Since the spacer 30 has a uniform thickness d, a spacing d between the partially transmissive reflective film 11 and the high reflectance reflector 21 is held at a length of, for example, 1 to 10 mm. When the spacing d between the partially transmissive reflective film 11 and the high reflectance reflector 21 is excessively narrow, the number of reflections of incident light increases, effects of dust and scratches increase, and attenuation of light caused by reflection loss increases. In contrast, when the spacing d between the partially transmissive reflective film 11 and the high reflectance reflector 21 is excessively wide, a ratio of a place, from which light does not come out, increases. FIG. 3A shows a state of outgoing light in a case where a spacing d between the partially transmissive reflective film 11 and the high reflectance reflector 21 is appropriate, and FIG. 3B shows a state of outgoing light in a case where the spacing d between the partially transmissive reflective film 11 and the high reflectance reflector 21 is wide. As can be seen from FIG. 3B, when the spacing d between the partially transmissive reflective film 11 and the high reflectance reflector 21 is excessively wide, a ratio of a place, from which light does not come out, increases. Further, when the spacing d is excessively wide, the size of the optical device increases. Accordingly, in the embodiment, the spacing d between the partially transmissive reflective film 11 and the high reflectance reflector 21 is set to about 1 to 10 mm, and preferably set to about 3 to 6 mm.

The gap between the partially transmissive reflective film 11 and the high reflectance reflector 21 is filled with air as a low refractive index layer. A refractive index of the air is lower than refractive indexes of the second transparent substrate 10 and the first transparent substrate 20.

The optical device 1 is, as shown in FIG. 1, provided at an angle of 45 degrees to viewer's eyes 50. However, the angle is not necessarily set to 45 degrees. By decreasing a slope of the optical device 1, the optical device 1 may be erected such that the viewer's eyes 50 confront the face of the second transparent substrate 10. However, in this case, it is necessary for an angle of incidence of light, which is incident onto a surface of the high reflectance reflector 21 of the protrusion portion 22, to be approximately 0 degrees. However, when the angle of incidence is at 0 degrees, the number of reflections is infinite, and thus the angle has a limit.

The light is made to be incident from a side of a surface of the protrusion portion 22, on which the high reflectance reflector 21 is formed, into a gap between the partially transmissive reflective film 11 and the high reflectance reflector 21. The light is made to be incident with a width that is sufficient for the spacing between the partially transmissive reflective film 11 and the high reflectance reflector 21. Further, depending on a size of the virtual image, the light is made to be incident at the angle which is changed as indicated by the dashed line arrows in FIG. 1.

Figure 4:
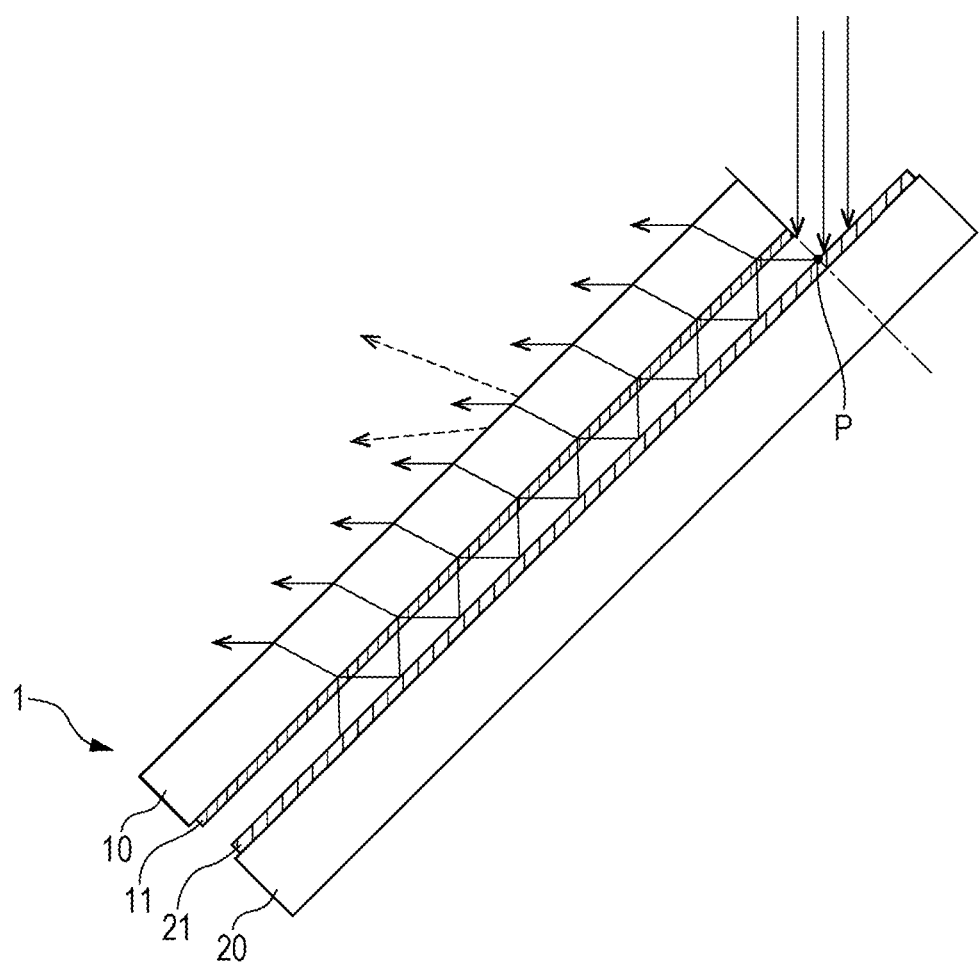
FIG. 4 is a cross-sectional view illustrating an incidence position of light in the optical device.

It is preferable that, as shown in FIG. 4, a position of a center of the incident light be close to a boundary position P at which a perpendicular drawn from an incident end of the partially transmissive reflective film 11 to the high reflectance reflector 21 intersects with the high reflectance reflector 21. As described above, the light with the sufficient width can be made to be incident.

Figure 5:
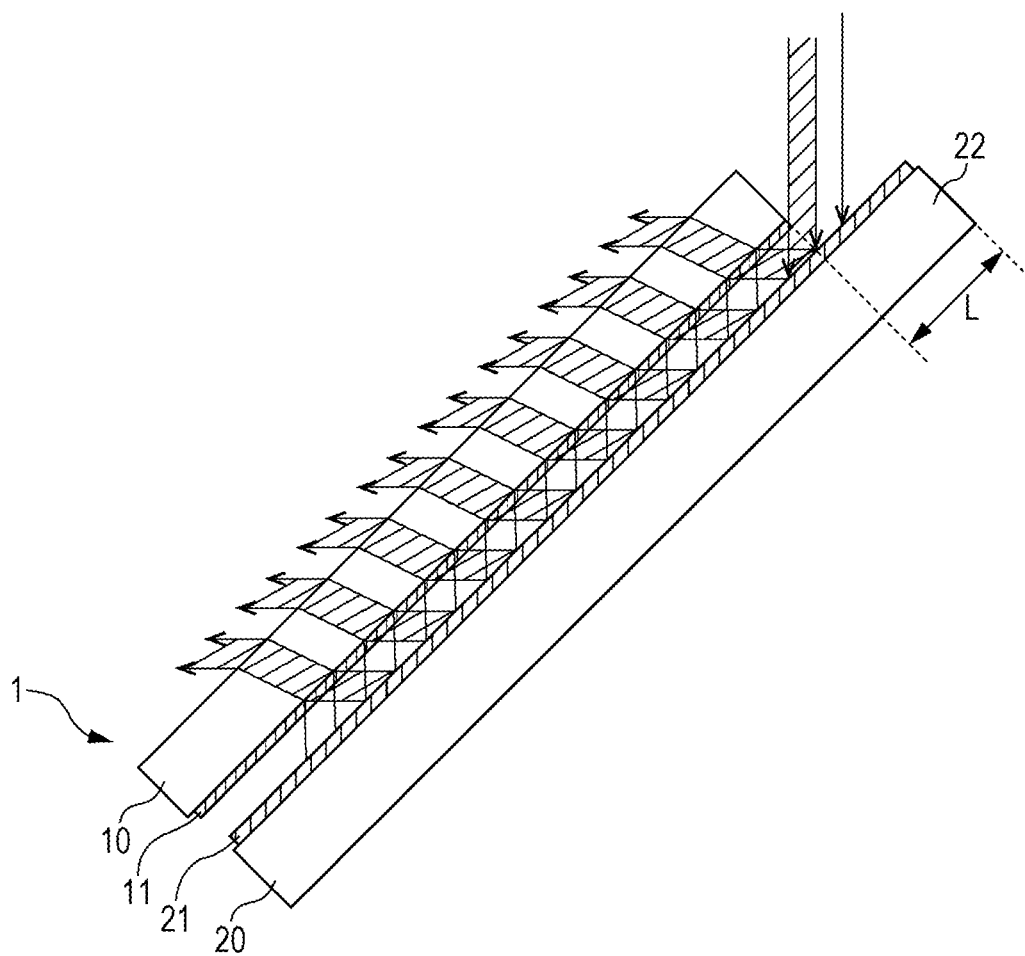
FIG. 5 is a cross-sectional view illustrating a state of light emission in a case where it is assumed that there is no protrusion portion in the optical device.

A length of the protrusion portion 22, on which the high reflectance reflector 21 is formed, can be determined depending on light 60 of which the angle of incidence onto the face of the high reflectance reflector 21 is largest as shown in FIG. 1. That is, a length of the protrusion portion 22, on which the high reflectance reflector 21 is formed, can be determined such that a width of the light 60 is a sufficient width. If it is assumed that the protrusion portion 22 on which the high reflectance reflector 21 is formed is not provided, as shown in FIG. 5, a problem arises in that only light corresponding to the width of the hatched portion is made to be incident, and a part from which the light does not come out increases. However, in the embodiment, the length of the protrusion portion 22, on which the high reflectance reflector 21 is formed, is set such that the light 60 with the largest angle of incidence is made to be incident with a sufficient width.

As described above, in the optical device 1 of the embodiment, light is incident from the protrusion portion 22, on which the high reflectance reflector 21 is formed, and is guided by air filled into the gap portion between the partially transmissive reflective film 11 and the high reflectance reflector 21. The light, which is incident into the gap between the partially transmissive reflective film 11 and the high reflectance reflector 21, is repeatedly reflected by the partially transmissive reflective film 11 and the high reflectance reflector 21, and travels inward. Then, a part of the light, which is incident onto the partially transmissive reflective film 11, is transmitted through the partially transmissive reflective film 11, is transmitted through the second transparent substrate 10, and is emitted from a viewer side surface thereof. A refractive index of the air, which guides light, is lower than that of the second transparent substrate 10, and thus a part of the light, which is incident onto the partially transmissive reflective film 11, is transmitted through the second transparent substrate 10 without total reflection. A rear surface of the second transparent substrate 10, on which the partially transmissive reflective film 11 is formed, is formed in parallel with the viewer side surface thereof. Therefore, the angle of incidence and the angle of emergence of light onto and from the second transparent substrate 10 are the same.

In the optical device 1 according to the embodiment of the invention, the incident light with a predetermined width can be diffused to cover the size of the partially transmissive reflective film 11 without using a configuration in which a diffraction grating or the like causing a stripe is provided on a light guiding section.

Accordingly, even when using a device having a small exit pupil such as a MEMS mirror scanner or a liquid crystal light valve, it is possible to enlarge the pupil of the viewer system without causing a stripe.

Further, when light is guided by internal total reflection of glass, plastic, or the like, an angle of view is limited to a critical angle depending on the refractive index of the transparent substrate. However, the optical device 1 according to the embodiment of the invention guides light through air which has a refractive index lower than that of the transparent substrate, and thus there is no limitation mentioned above. Furthermore, since a structure thereof is simple, there is an advantage in that manufacture is easily performed.

Second Embodiment

Subsequently, a second embodiment of the invention will be described with reference to FIG. 6. In the first embodiment, the partially transmissive reflective film 11 is provided on a side of a surface of the second transparent substrate 10 facing the high reflectance reflector 21. However, the second embodiment is an example in which the partially transmissive reflective film 11 is provided on the viewer side surface of the second transparent substrate 10.

Figure 6:
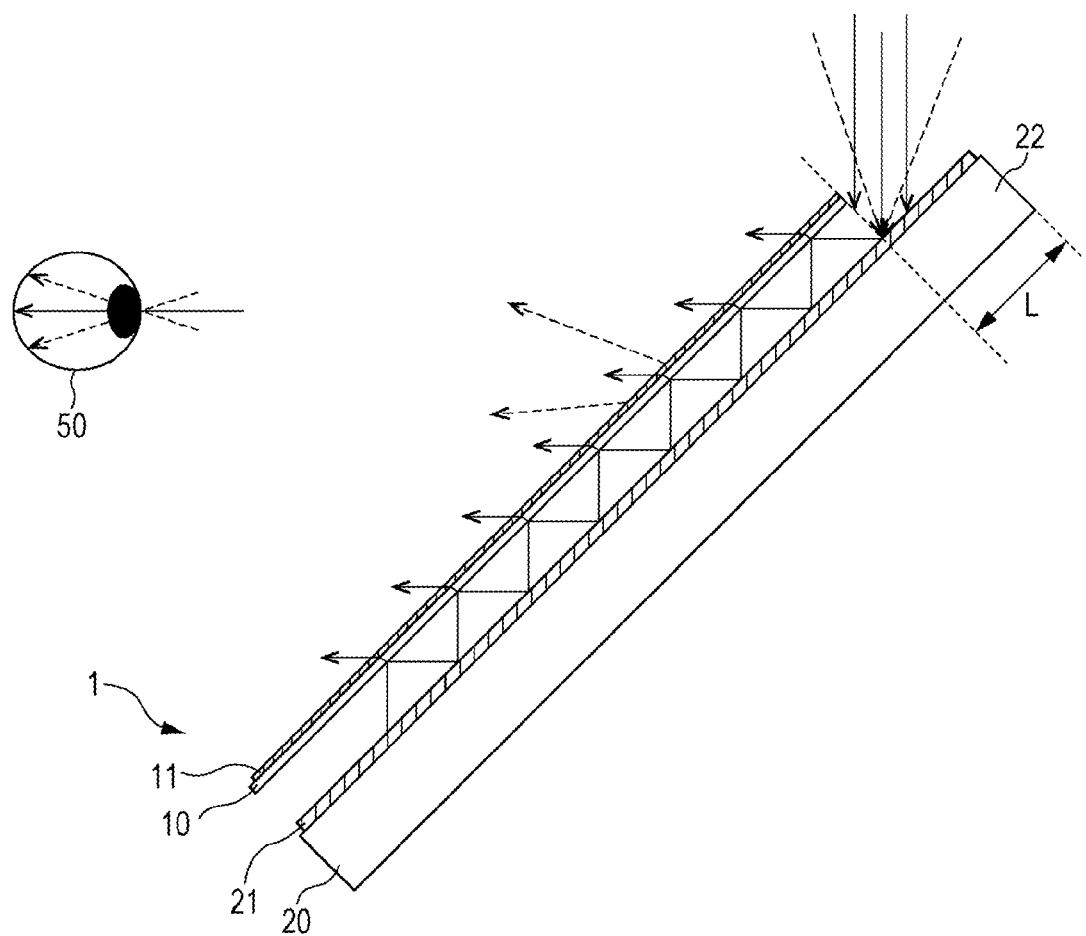
FIG. 6 is a cross-sectional view illustrating an optical device according to a second embodiment.

As shown in FIG. 6, the partially transmissive reflective film 11 is provided on the viewer side surface of the second transparent substrate 10. Further, as the second transparent substrate 10, a substrate, which is thinner than the second transparent substrate 10 of the first embodiment, is used. Specifically, the second transparent substrate 10 has a thickness which is about 10% of the thickness of the air layer which guides light. For example, the second transparent substrate 10 is formed of a PET film of 10 μm.

When the second transparent substrate 10 becomes thick, the spacing of the light guiding section may be set in a similar manner to the first embodiment. In this case, the spacing between the high reflectance reflector 21 and the partially transmissive reflective film 11 provided on the viewer side surface of the second transparent substrate 10 increases. Thus, as shown in FIG. 3, a problem arises in that the ratio of the place, from which light does not come out, increases. However, as described in the embodiment, the second transparent substrate 10 may be formed with the thickness which is about 10% of the thickness of the air layer which guides light. In this case, even when the partially transmissive reflective film 11 is provided on the viewer side surface of the second transparent substrate 10, the above-mentioned problem does not arise.

Even in such a configuration of the embodiment, it is possible to enlarge the pupil of the viewer system without causing a stripe. Further, since light is guided through air which has a refractive index lower than that of the transparent substrate, the angle of view is not restricted by the refractive index of the transparent substrate. Furthermore, since a structure thereof is simple, there is an advantage in that manufacture is easily performed.

Third Embodiment

Subsequently, a third embodiment of the invention will be described with reference to FIGS. 7A and 7B. The first embodiment described the example of the optical device of the invention in which the pupil is enlarged. However, the third embodiment will describe an example of a virtual image display apparatus in which the pupil is enlarged through combination of an optical device of the related art and the optical device of the invention.

As shown in FIGS. 7A and 7B, in the embodiment, an optical device 70 using a diffraction grating such as a hologram or a half mirror array in the related art and the optical device 1 according to the embodiment of the invention are combined. As the optical device 70, for example, an optical device having a half mirror array 71 is used.

Incident light is diffused in the y direction by the optical device 70, and is made to be incident into the optical device 1 according to the embodiment of the invention, and the incident light is diffused in the x direction by the optical device 1 according to the embodiment of the invention. With such a configuration, at a first stage of diffusing the incident light in the y direction, the size of the optical device itself is small, and an area of the exit surface is also small. Therefore, even the optical device 70 having the half mirror array 71 in the related in which the structure thereof is complex can be easily manufactured. Then, at a second stage of diffusing the incident light in the x direction, it is necessary to increase the area of the exit surface. However, by using the optical device 1 according to the embodiment of the invention having the simple structure, the optical device can be easily manufactured.

In the optical devices having half mirror arrays at both of the first and second stages, stripes caused by the half mirror arrays occur in both of the y direction and the x direction. However, with such a configuration of the embodiment, the stripe caused by the half mirror array may occur only in the y direction.

Fourth Embodiment

Subsequently, a fourth embodiment of the invention will be described with reference to FIG. 8. The third embodiment described the example of the virtual image display apparatus in which the optical device 1 according to the embodiment of the invention and the optical device having the half mirror array are combined. However, the fourth embodiment will describe an example of a virtual image display apparatus in which the pupil is enlarged through combination of the optical device 1 according to the embodiment of the invention and an optical device having a hologram in the related art.

Figure 8:
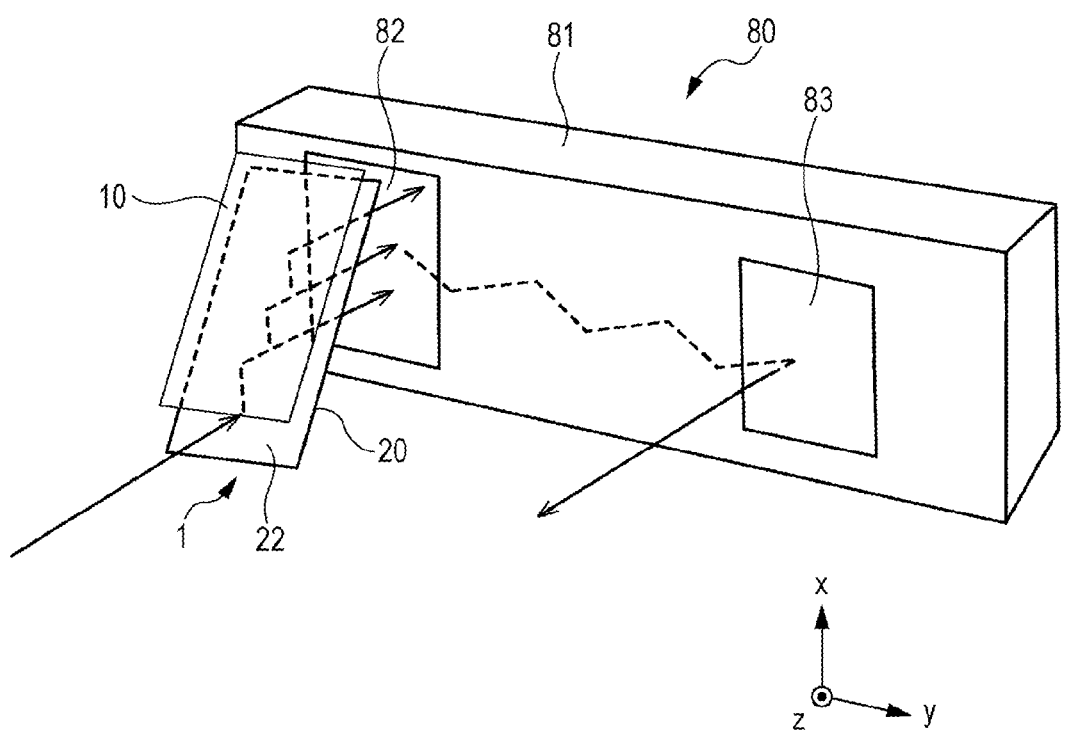
FIG. 8 is a perspective view illustrating a virtual image display apparatus according to a fourth embodiment.

As shown in FIG. 8, an optical device 80 in the related art includes a light guiding plate 81, an incidence side hologram 82, and an exit side hologram 83. In the embodiment, the optical device 1 according to the embodiment of the invention is placed in front of the incidence side hologram 82 of the optical device 80, and the optical device 1 is tilted such that light is incident onto the incidence side hologram 82 at a predetermined angle. In the embodiment, the optical device 1 is placed such that the protrusion portion 22 of the first transparent substrate 20 in the optical device 1 is on the lower side, and light is made to be incident from the protrusion portion 22 on the lower side. It should be noted that FIG. 8 does not show the partially transmissive reflective film 11 and the high reflectance reflector 21.

According to the embodiment, light, which is emitted from a MEMS mirror scanner, a micromini projector, or the like using a liquid crystal panel and the like, is made to be incident into the optical device 1 according to the embodiment of the invention, and the incident light is diffused in the x direction. Then, the incident light diffused in the x direction is made to be incident onto the incidence side hologram 82 of the optical device 80, and is guided in the y direction by the light guiding plate 81. Then, light is extracted by the exit side hologram 83. With such a configuration, the optical device according to the embodiment of the invention can be applied to a wearable virtual image display apparatus, such as a head mounted display, and the like.

Fifth Embodiment

Subsequently, a fifth embodiment of the invention will be described with reference to FIGS. 9 and 10. The third and fourth embodiments described the example of the virtual image display apparatus in which the optical device 1 according to the embodiment of the invention and an optical device in the related art were combined. However, the fifth embodiment will describe an example of a virtual image display apparatus in which the pupil is enlarged using the optical devices 1 according to the embodiment of the invention at first and second stages.

Figure 9:
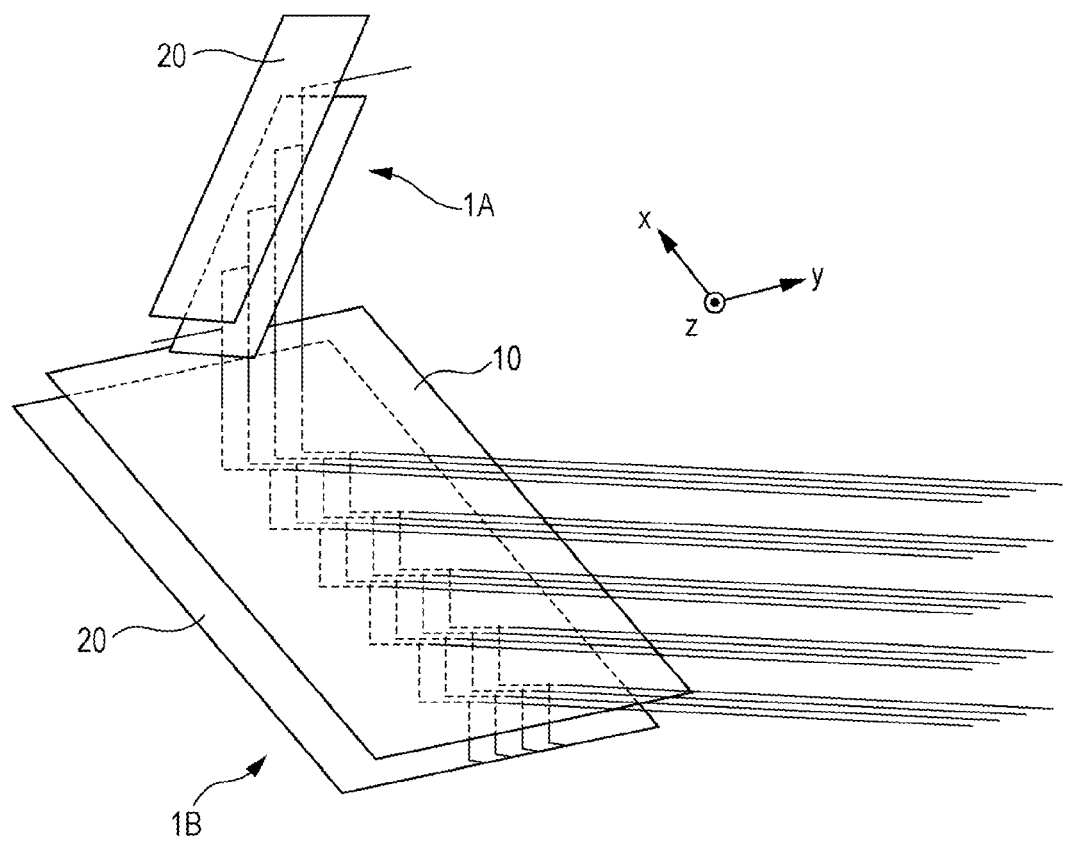
FIG. 9 is a perspective view illustrating a virtual image display apparatus according to a fifth embodiment.
Figure 10:
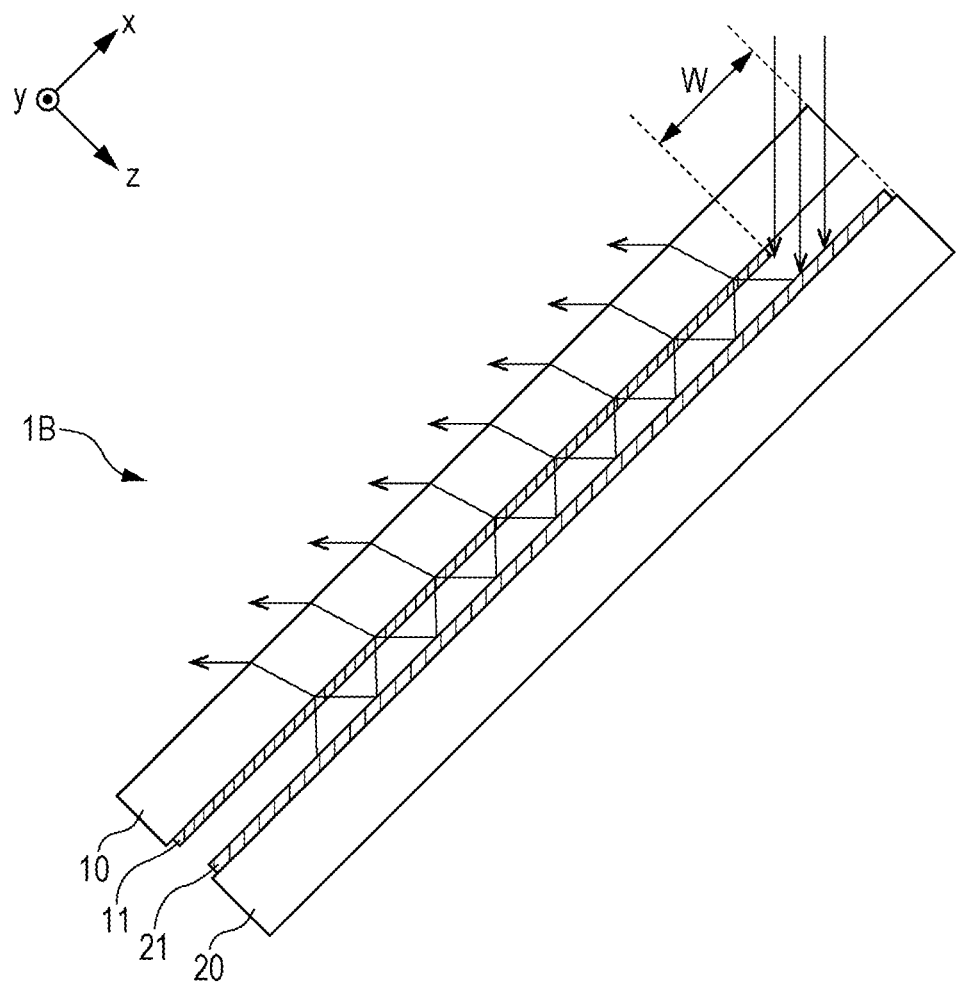
FIG. 10 is a cross-sectional view illustrating an optical device which is used in the virtual image display apparatus of the fifth embodiment.

As shown in FIG. 9, in the embodiment, an optical device 1A according to the embodiment of the invention is used as the optical device at the first stage, and an optical device 1B according to the embodiment of the invention is used as the optical device at the second stage. The optical device 1A has the same configuration as the optical device 1 described in the first embodiment. In the optical device 1B, as shown in FIG. 10, the second transparent substrate 10 and the first transparent substrate 20 have the same lengths in the x direction, and the protrusion portion 22 is not provided on the first transparent substrate 20. However, the partially transmissive reflective film 11 is not provided throughout the entirety of the surface of the second transparent substrate 10 facing the high reflectance reflector 21, and the partially transmissive reflective film 11 is not provided in range of a width W on the upper end portion of the second transparent substrate 10. That is, the transmittance of the upper end portion is high, and thus light can be made to be incident from the viewer side surface of the second transparent substrate 10. With such a configuration, it is possible to seal four sides of the optical device 1B, and thus it is possible to improve parallelism and flatness, and it is possible to prevent occurrence of contamination caused by intrusion of dust.

In the embodiment, the optical device 1A at the first stage and the optical device 1B at the second stage are provided to be tilted by the angle of incidence with respect to the central ray. For example, the optical device 1A at the first stage is provided to be tilted by 45 degrees with respect to the central ray of the incident light from the y direction of FIG. 9, and the angle of incidence of the central ray of the incident light is set to 45 degrees. The optical device 1B at the second stage is provided to be tilted by 45 degrees with respect to a viewer, and the light, which is emitted from the optical device 1A at the first stage, is made to be incident onto the optical device 1B at the second stage at the angle of incidence of 45 degrees. With such a configuration, the central ray is emitted toward the front of the viewer. However, it is not necessary for the angle of incidence to be 45 degrees, and the angle may be, for example, 30 degrees. With such a configuration, it is possible to decrease the tilt angles of the optical device 1A and the optical device 1B.

According to the embodiment, none of the optical device at the first stage and the optical device at the second stage uses the diffraction grating. Hence, it is possible to enlarge the pupil of the viewer system while suppressing occurrence of the stripe caused by the diffraction grating.

Sixth Embodiment

Subsequently, a sixth embodiment of the invention will be described with reference to FIG. 11. Each above-mentioned embodiment described the example in which light is made to be incident from a single direction into the optical device 1 according to the embodiment of the invention. However, the sixth embodiment will describe an example in which light is made to be incident in two directions into the optical device 1 according to the embodiment of the invention.

Figure 11:
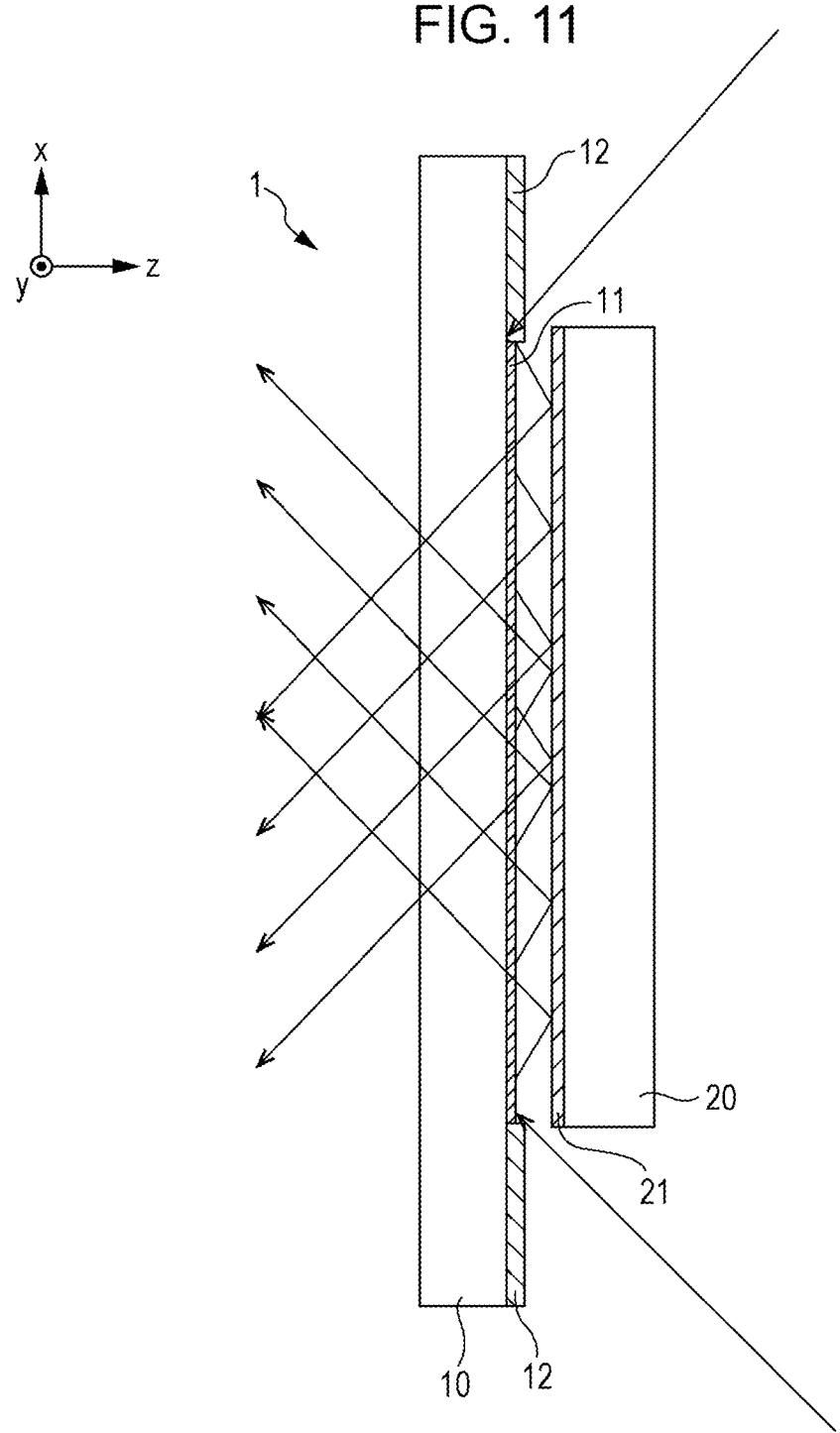
FIG. 11 is a cross-sectional view illustrating an optical device according to a sixth embodiment.

In the embodiment, as shown in FIG. 11, a length of the second transparent substrate 10 in the x direction is longer than a length of the first transparent substrate 20 in the x direction. The partially transmissive reflective film 11 is provided on a surface of the second transparent substrate 10 facing the high reflectance reflector 21 so as to face the high reflectance reflector 21. Furthermore, high reflectance reflectors 12 are provided on the upper side and the lower side of the partially transmissive reflective film 11.

Light is made to be incident from a side of the first transparent substrate 20, that is, from the rear surface side thereof. The light beams are incident in two directions from the upper side and the lower side on which the high reflectance reflectors 12 are provided. By using light beams which are modulated by image signals based on information pieces of respectively different angles of incident light, the light beams are respectively incident in the two directions from the upper side and the lower side on which the high reflectance reflectors 12 are provided. Thereby, it is possible to display a virtual image having a wide angle of view.

In the embodiment, a configuration is made such that the incidence direction of the light incident onto the high reflectance reflectors 12 is different from the exit direction of the light emitted from the second transparent substrate 10. With such a configuration, a degree of freedom in design is improved, and thus it is possible to improve design or usability.

Seventh Embodiment

Figure 12:
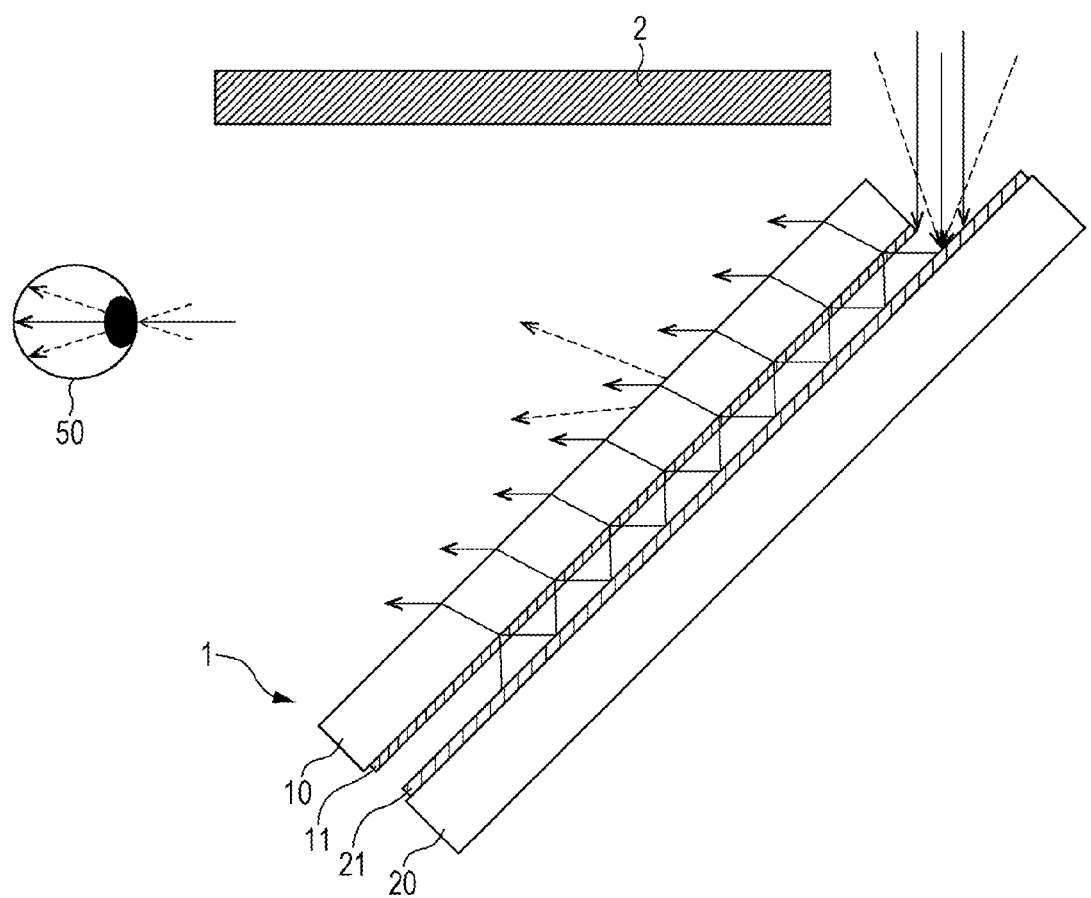
FIG. 12 is a cross-sectional view illustrating a virtual image display apparatus according to a seventh embodiment.

Subsequently, a seventh embodiment of the invention will be described with reference to FIG. 12. The embodiment will describe an example in which a light blocking plate covering the optical device 1 according to the embodiment of the invention is provided. As shown in FIG. 12, in the embodiment, a light blocking plate 2 is disposed substantially in parallel with the outgoing light of the optical device 1, and is configured to cover at least an exit side surface of the optical device 1.

Since the optical device 1 includes the high reflectance reflector 21, at a place where the outside light is strong, a light source thereof is reflected in the high reflectance reflector 21, and light is reflected to the viewer side. However, by providing the light blocking plate 2, it is possible to prevent the outside light from being reflected inward. FIG. 12 shows an example in which the light blocking plate 2 is provided in the optical device 1 described in the first embodiment. However, the light blocking plate 2 may be provided on the optical device 1 described in another embodiment.

Eighth Embodiment

Figure 13:
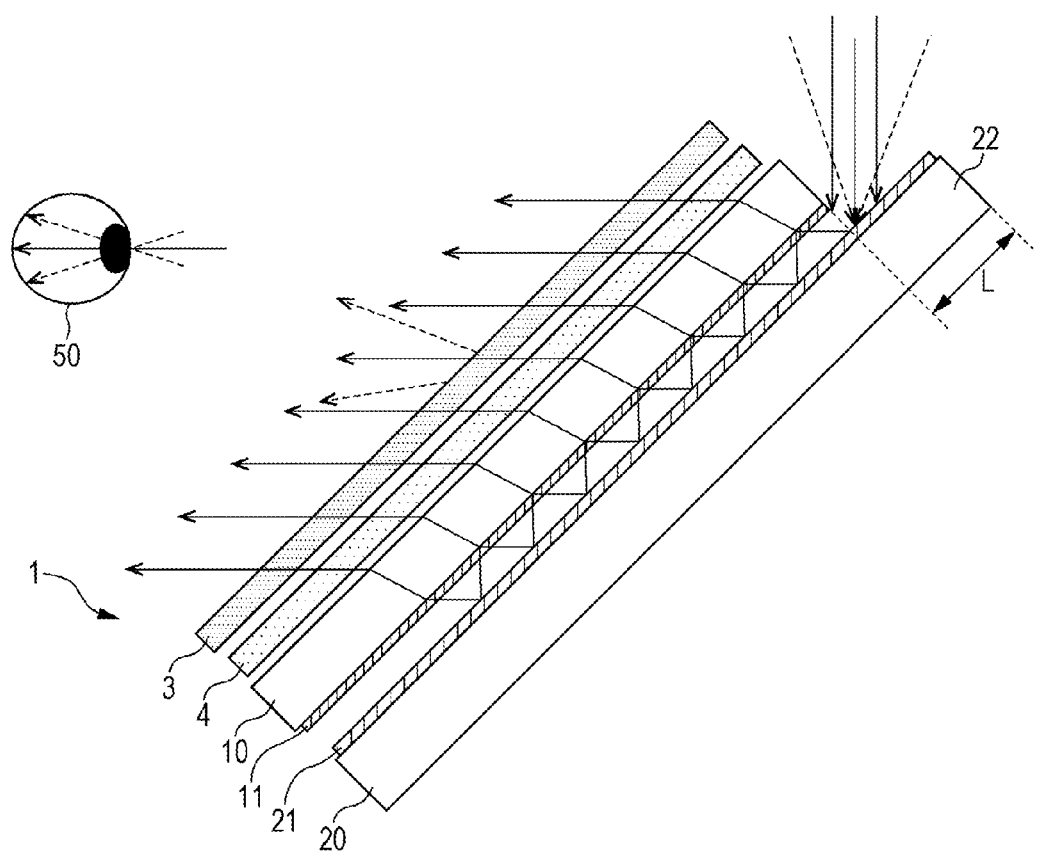
FIG. 13 is a cross-sectional view illustrating a virtual image display apparatus according to an eighth embodiment.

Subsequently, an eighth embodiment of the invention will be described with reference to FIGS. 13 to 14C. The embodiment will describe an example in which the optical device 1 according to the embodiment of the invention, a polarization plate, and a ¼ wavelength plate are combined. As shown in FIG. 13, in the embodiment, a polarization plate 3 and a ¼ wavelength plate 4 are disposed with a predetermined spacing therebetween on the upper portion of the exit side surface of the optical device 1.

Figure 14A:
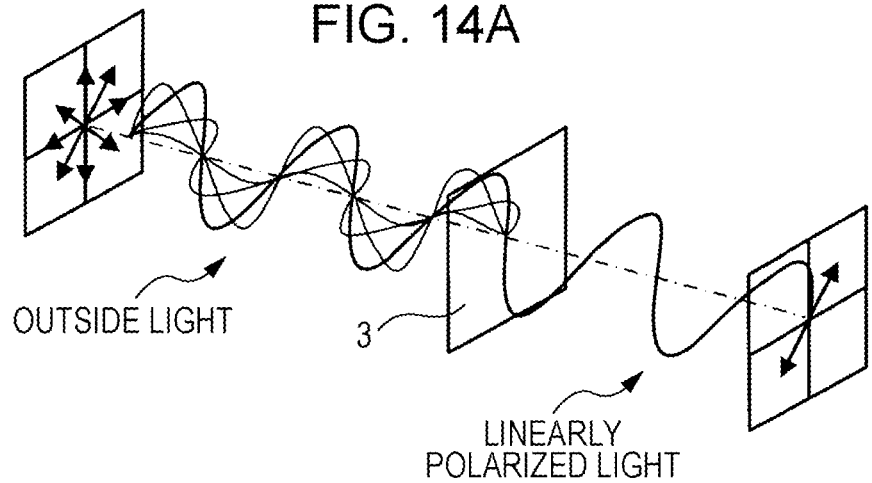
FIG. 14A is a schematic diagram illustrating a state where outside light is polarized by a polarization plate.
Figure 14B:
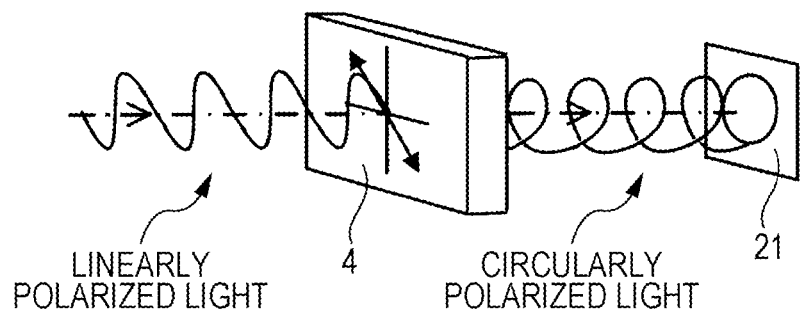
FIG. 14B is a schematic diagram illustrating a state where linearly polarized light is circularly polarized by a ¼ polarization plate.
Figure 14C:
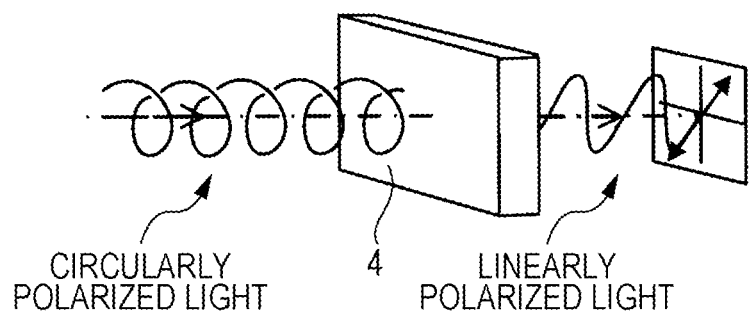
FIG. 14C is a schematic diagram illustrating a state where circularly polarized light is linearly polarized by the ¼ polarization plate.

As shown in FIG. 14A, when outside light is incident onto the polarization plate 3, the outside light is linearly polarized at an azimuthal angle of, for example, 45 degrees by the polarization plate 3. As described above, the linearly polarized outside light is incident onto the ¼ wavelength plate 4 as shown in FIG. 14B, the linearly polarized light becoming circularly polarized by the ¼ wavelength plate 4. When the circularly polarized outside light is reflected by the high reflectance reflector 21, the outside light is circularly polarized in a reverse rotation direction as shown in FIG. 14C, and is incident again onto the ¼ wavelength plate 4. The outside light, which is circularly polarized in the reverse rotation direction, is linearly polarized by the ¼ wavelength plate 4, but the polarization direction is rotated by 90 degrees as compared with the direction at the time of incidence. Consequently, when the linearly polarized outside light is incident again onto the polarization plate 3, the polarization direction is rotated by 90 degrees as compared with the direction at the time of incidence. Hence, the light is absorbed by the polarization plate 3.

In contrast, when light incident from the protrusion portion 22 provided with the high reflectance reflector 21 is incident onto the polarization plate 3, the light is randomly polarized. Further, when the light incident from the protrusion portion 22 is linearly polarized at the time of incidence, by making the light be incident onto the ¼ wavelength plate 4, the light becomes circularly polarized by the ¼ wavelength plate 4, and the circularly polarized light is incident onto the polarization plate 3. Consequently, there is a light component absorbed by the polarization plate 3, but there is also a light component being transmitted through the polarization plate 3. Hence, the light is displayed as a virtual image.

As described above, according to the embodiment, by providing the polarization plate 3 and the ¼ wavelength plate 4 on the optical device 1, even when the optical device 1 is used at a place where the outside light is strong, it is possible to prevent the outside light from being reflected inward.

Ninth Embodiment

Figure 15:
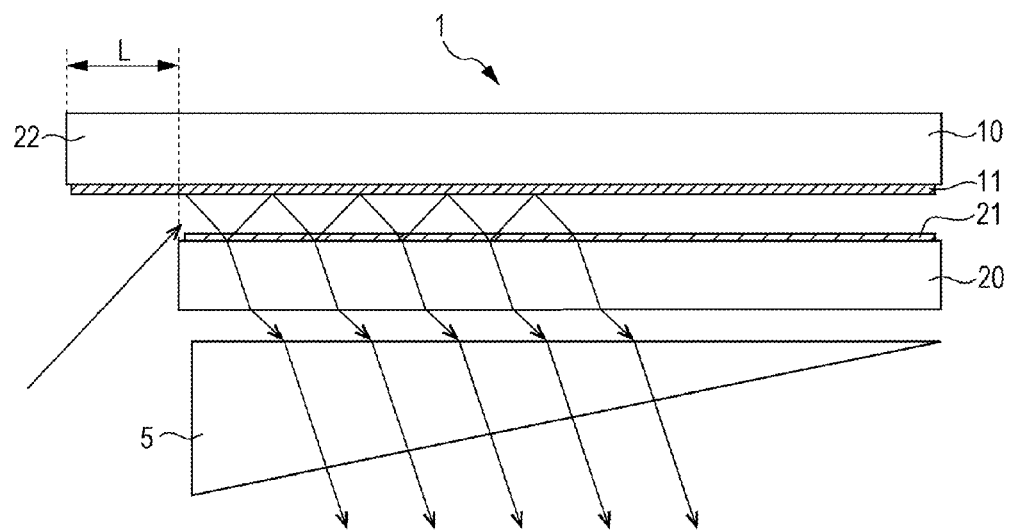
FIG. 15 is a cross-sectional view illustrating a virtual image display apparatus according to a ninth embodiment.

Subsequently, a ninth embodiment of the invention will be described with reference to FIG. 15. The embodiment will describe an example in which a wedge-shaped substrate is provided to face the exit side surface of the optical device 1 according to the embodiment of the invention. As shown in FIG. 15, in the embodiment, a wedge-shaped substrate 5 made of a transparent material is disposed to face the exit side surface of the optical device 1.

The wedge-shaped substrate 5 is disposed such that a thick portion thereof is provided near the protrusion portion 22, on which the high reflectance reflector 21 is provided, as a light incidence section of the optical device 1. When the wedge-shaped substrate 5 is made of a material with a refractive index of 1.5 and an angle of incidence of the central ray is 45 degrees, an angle of refraction is about 28 degrees. When a vertex angle of the wedge-shaped substrate 5 is set to about 28 degrees, an angle of emergence to the normal line of the optical device 1 is about 28 degrees. That is, compared with the case where the wedge-shaped substrate 5 is not used, it is possible to decrease the angle of emergence by about 17 degrees.

When the optical device 1 having the wedge-shaped substrate 5 of the embodiment is used as the optical device 1A at the first stage described in the fifth embodiment, it is possible to decrease the tilt angle of the optical device 1A to the optical device 1B at the second stage. As a result, it is possible to decrease the size of the entire apparatus.

Further, by adjusting the angle of the incident surface, the vertex angle, and the angle of the exit surface of the wedge-shaped substrate 5, it is also possible to emit light at an angle of 0 degrees to the normal line of the optical device 1. Furthermore, a Fresnel prism sheet, in which a plurality of the wedge-shaped substrates 5 is arranged, may be used.

Application Example

Figure 16:
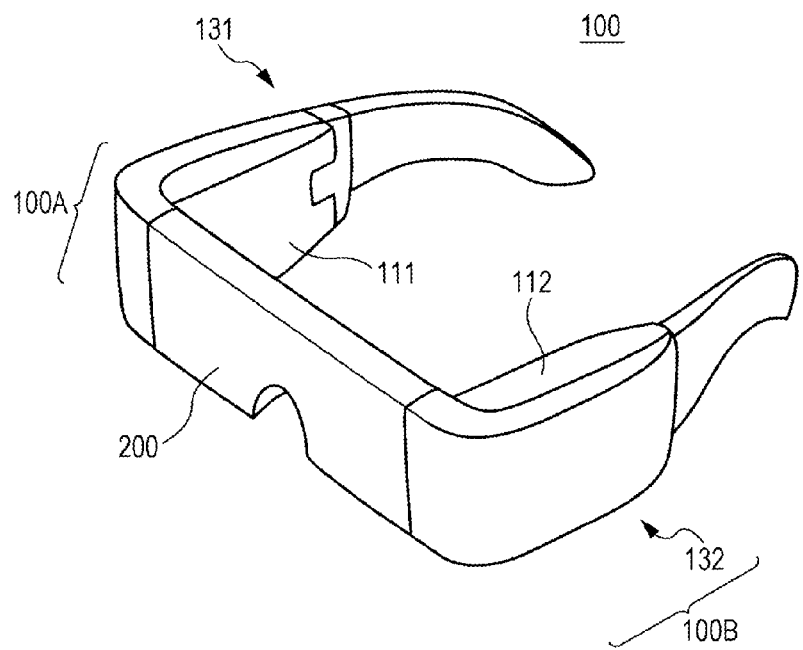
FIG. 16 is a perspective view illustrating a virtual image display apparatus of an application example.

FIG. 16 is a perspective view illustrating an example of an overview of a head mounted display 100 as an example of a virtual image display apparatus according to an application example of the invention. As shown in FIG. 16, a head mounted display 100 according to the embodiment is a head mounted display which has an appearance like that of eyeglasses. A viewer, who wears the head mounted display 100, is able to be in visual contact with image light based on a virtual image, and the viewer is able to view an external image as a see-through image.

Specifically, the head mounted display 100 includes: a light guiding plate 200; a pair of right and left temples 131 and 132 that supports the light guiding plate 200; and a pair of image forming devices 111 and 112 added to the temples 131 and 132. Here, in the drawings, a first display apparatus 100A, in which the left side of the light guiding plate 200 and the image forming device 111 are combined, is a part that forms a virtual image for the right eye, and even singly functions as an image display apparatus. Further, in the drawings, a second display apparatus 100B, in which the right side of the light guiding plate 200 and the image forming device 112 are combined, is a part that forms a virtual image for the left eye, and even singly functions as an image display apparatus.

The light guiding plate 200 can be configured such that, for example, combinations of the optical device 80 and the optical device 1 described in the fourth embodiment are disposed to correspond to the left eye and the right eye. The first display apparatus 100A and the second display apparatus 100B may include, for example, a liquid crystal panel and a projection optical system. Even when it is possible to use a device having a small exit pupil such as a liquid crystal panel, by using combination of the optical device 80 and the optical device 1 described in the fourth embodiment as the light guiding plate 200, it is possible to enlarge the exit pupil of the viewer system.

Modification Example

The invention is not limited to the above-mentioned embodiments, and may be modified into, for example, various forms to be described below. Further, it is apparent that the embodiments and modification examples may be appropriately combined.

Figure 17:
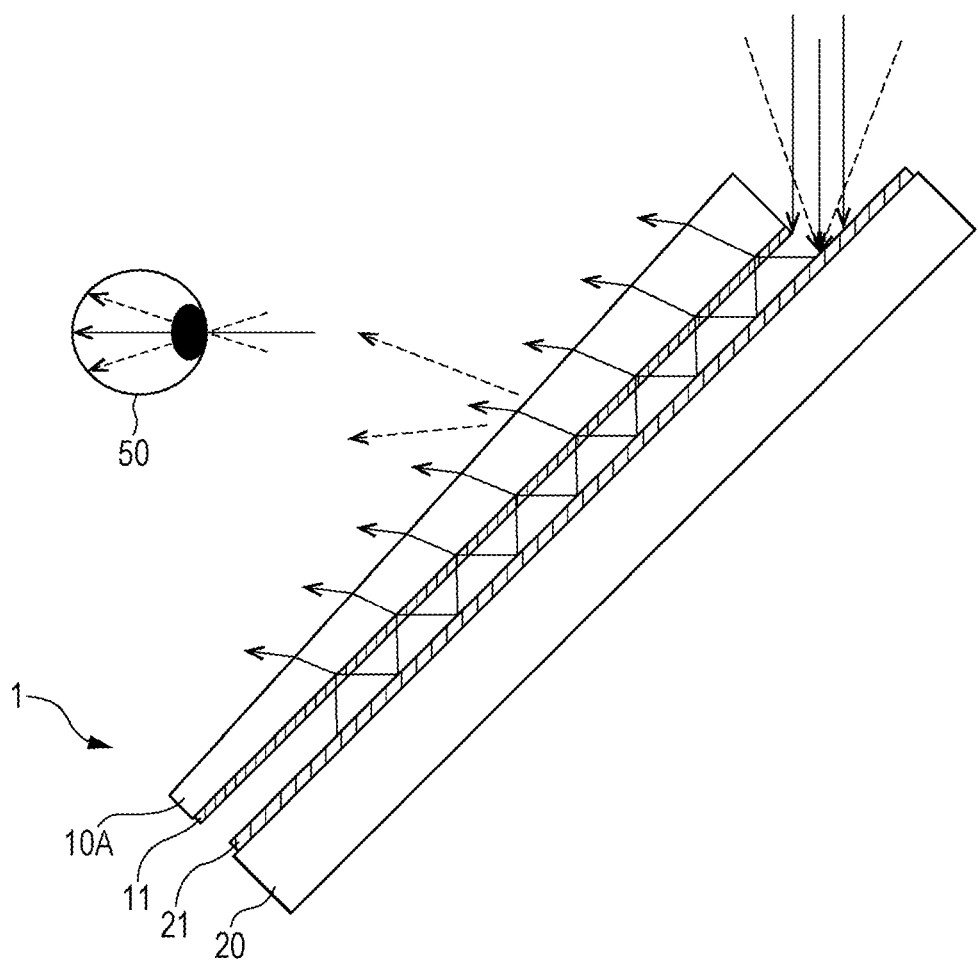
FIG. 17 is a cross-sectional view illustrating an optical device according to a modification example.

(1) The first embodiment described the example of the second transparent substrate 10 of which the front surface and the rear surface are in parallel, but the invention is not limited to such an example. For example, as shown in FIG. 17, a second transparent substrate 10A having a wedge shape in cross sectional view may be used. Even when the second transparent substrate 10A having a wedge shape in cross sectional view is used, the exit side surface is planar, and thus the angle of emergence is the same at any position. Accordingly, it is possible to satisfactorily display a virtual image in which the exit pupil is enlarged. Further, by adjusting an angle of the incident surface and an angle of the exit surface of the second transparent substrate 10A having a wedge shape in cross sectional view, it is possible to adjust the angle of emergence to the normal line of the optical device 1.

(2) The above-mentioned embodiments described the case where the transmittance of the partially transmissive reflective film 11 is uniform, but the invention is not limited to such examples. For example, the transmittance of the partially transmissive reflective film 11 may be set to be high on the inside in the light guiding direction as viewed from the incidence side. In this case, it is possible to prevent brightness from being changed depending on a position of the eyes.

(3) The second embodiment described the example in which the partially transmissive reflective film 11 is provided on the exit side surface of the second transparent substrate 10, but the invention is not limited to such examples. For example, the high reflectance reflector 21 may be provided on the rear surface on a side opposite to the surface of the first transparent substrate 20 facing the second transparent substrate 10.

(4) The sixth embodiment described the example in which the light beams are respectively incident in the two directions from the upper side and the lower side of the optical device 1, but the invention is not limited to such examples. For example, the light beams may be made to be incident in three or four directions.

Figure 18:
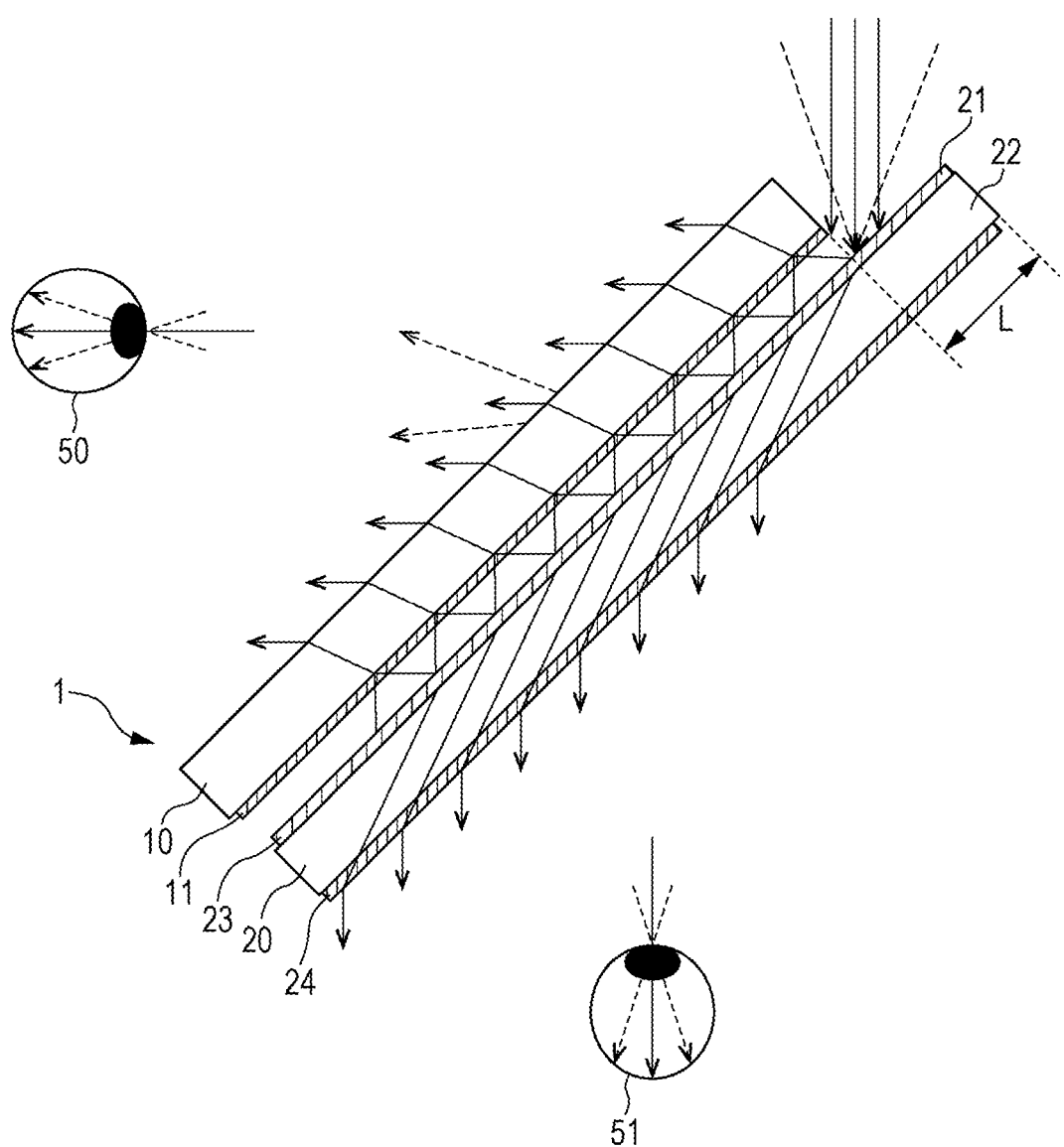
FIG. 18 is a cross-sectional view illustrating an optical device according to a modification example.

(5) The above-mentioned embodiments or modification examples described the examples in which only the high reflectance reflector 21 is provided on the first transparent substrate 20, but the invention is not limited to such examples. For example, as shown in FIG. 18, the high reflectance reflector 21 may be provided only on the protrusion portion 22 of the first transparent substrate 20, and partially transmissive reflective films 23 and 24 may be provided on both surfaces of the surface of the first transparent substrate 20 facing the second transparent substrate 10 and the rear surface on a side opposite to the facing surface. In such a manner, it is possible to make a virtual image reach not only the viewer's eyes 50 on the second transparent substrate 10 side, but also the viewer's eyes 51 on the first transparent substrate 20.

(6) The above-mentioned embodiments or modification examples described the examples in which light is guided by the air layer between the second transparent substrate 10 and the first transparent substrate 20, but the invention is not limited to such examples. For example, the gap between the second transparent substrate 10 and the first transparent substrate 20 may be filled with a gas such as nitrogen, instead of air.

(7) The invention may be applied to not only the above-mentioned head mounted display but also various virtual image display apparatuses such as a pseudo window, a virtual image display, and a head-up display.

The entire disclosure of Japanese Patent Application No. 2013-248928, filed Dec. 2, 2013 is expressly incorporated by reference herein.

What is claimed is:
1. An optical device comprising:
a first substrate;
a first reflective face that is disposed on one surface of the first substrate;
a second substrate that is made of a transmissive material; and
a partially transmissive reflective face that is disposed on one surface of the second substrate, wherein the first reflective face is disposed to be spaced apart from the partially transmissive reflective face, in parallel with the partially transmissive reflective face, wherein a refractive index of the second substrate is higher than a refractive index of a section between the first reflective face and the partially transmissive reflective face which are spaced apart, and wherein light incident into the section between the first reflective face and the partially transmissive reflective face which are spaced apart is repeatedly reflected between the first reflective face and the partially transmissive reflective face, and at least a part of the light is transmitted through the partially transmissive reflective face and incident onto the second substrate, and is emitted as outgoing light from a surface different from a surface on which the partially transmissive reflective face of the second substrate is provided.

2. The optical device according to claim 1,
wherein a gas, which has a refractive index lower than a refractive index of the second substrate, is enclosed between the first reflective face and the partially transmissive reflective face.

3. The optical device according to claim 1,
wherein a spacer, which holds spacing between the first reflective face and the partially transmissive reflective face, is provided between the first reflective face and the partially transmissive reflective face.

4. The optical device according to claim 1, further comprising
an incidence section that causes light to be incident into a gap between the first reflective face and the partially transmissive reflective face,
wherein the incidence section is a section in which the second reflective face, which reflects the incident light toward the gap between the first reflective face and the partially transmissive reflective face, is provided on an extending portion which extends from an end portion of the first substrate or the second substrate.

5. The optical device according to claim 4,
wherein a transmittance of a portion of the partially transmissive reflective face, which is located on a side opposite to the incidence section, is higher than a transmittance of a portion of the partially transmissive reflective face which is located on a side of the incidence section.

6. The optical device according to claim 1, further comprising
a light blocking section that prevents outside light from being superimposed upon the outgoing light which is emitted from the second substrate.

7. The optical device according to claim 1,
wherein a polarization plate and a ¼ wavelength plate are provided at a position on a side of the partially transmissive reflective face opposite to the first reflective face.

8. A virtual image display apparatus comprising:
the optical device according to claim 1; and
an image forming section that generates image light,
wherein the image forming section is disposed such that light, which is emitted from the image forming section, is incident into the section between the first reflective face and the partially transmissive reflective face which are spaced apart.

9. A virtual image display apparatus comprising:
the optical device according to claim 2; and
an image forming section that generates image light,
wherein the image forming section is disposed such that light, which is emitted from the image forming section, is incident into the section between the first reflective face and the partially transmissive reflective face which are spaced apart.

10. A virtual image display apparatus comprising:
the optical device according to claim 3; and
an image forming section that generates image light,
wherein the image forming section is disposed such that light, which is emitted from the image forming section, is incident into the section between the first reflective face and the partially transmissive reflective face which are spaced apart.

11. A virtual image display apparatus comprising:
the optical device according to claim 4; and
an image forming section that generates image light,
wherein the image forming section is disposed such that light, which is emitted from the image forming section, is incident into the section between the first reflective face and the partially transmissive reflective face which are spaced apart.

12. A virtual image display apparatus comprising:
the optical device according to claim 5; and
an image forming section that generates image light,
wherein the image forming section is disposed such that light, which is emitted from the image forming section, is incident into the section between the first reflective face and the partially transmissive reflective face which are spaced apart.

13. A virtual image display apparatus comprising:
the optical device according to claim 6; and
an image forming section that generates image light,
wherein the image forming section is disposed such that light, which is emitted from the image forming section, is incident into the section between the first reflective face and the partially transmissive reflective face which are spaced apart.

14. A virtual image display apparatus comprising:
the optical device according to claim 7; and
an image forming section that generates image light,
wherein the image forming section is disposed such that light, which is emitted from the image forming section, is incident into the section between the first reflective face and the partially transmissive reflective face which are spaced apart.

15. The virtual image display apparatus according to claim 8, further comprising
a first optical device and a second optical device as the optical devices according to claim 1,
wherein the first optical device emits light, which is emitted from the image forming section, in an enlarged manner, along a first direction, and
wherein the second optical device emits light, which is emitted from the first optical device, in an enlarged manner, along a second direction intersecting with the first direction.

16. The virtual image display apparatus according to claim 8, further comprising
a first optical device and a second optical device as the optical devices according to claim 2,
wherein the first optical device emits light, which is emitted from the image forming section, in an enlarged manner, along a first direction, and
wherein the second optical device emits light, which is emitted from the first optical device, in an enlarged manner, along a second direction intersecting with the first direction.

17. The virtual image display apparatus according to claim 8, further comprising
- a first optical device and a second optical device as the optical devices according to claim 3,
- wherein the first optical device emits light, which is emitted from the image forming section, in an enlarged manner, along a first direction, and
- wherein the second optical device emits light, which is emitted from the first optical device, in an enlarged manner, along a second direction intersecting with the first direction.

18. The virtual image display apparatus according to claim 8, further comprising:
- a first optical device that is the optical device according to claim 1; and
- a second optical device that is an optical device having a diffraction grating,
- wherein the first optical device emits light, which is emitted from the image forming section, in an enlarged manner, along a first direction, and
- wherein the second optical device emits light, which is emitted from the first optical device, in an enlarged manner, along a second direction intersecting with the first direction.

19. The virtual image display apparatus according to claim 8, further comprising:
- a first optical device that is an optical device having a diffraction grating; and
- a second optical device that is the optical device according to claim 1,
- wherein the first optical device emits light, which is emitted from the image forming section, in an enlarged manner, along a first direction, and
- wherein the second optical device emits light, which is emitted from the first optical device, in an enlarged manner, along a second direction intersecting with the first direction.

20. The virtual image display apparatus according to claim 8,
- wherein at least a first incidence section and a second incidence section are provided as the incidence sections, and
- wherein the image forming section causes light, which is modulated by different image signals, to be respectively incident onto the first incidence section and the second incidence section.

* * * * *